No. 886,200. PATENTED APR. 28, 1908.
F. M. FOOTE.
ROLLER BEARING.
APPLICATION FILED AUG. 8, 1906.

WITNESSES.
Charles O. Miller
Louis C. Miller

INVENTOR.
Frank M. Foote

UNITED STATES PATENT OFFICE.

FRANK M. FOOTE, OF MARSHALL, MICHIGAN.

ROLLER-BEARING.

No. 886,200.  Specification of Letters Patent.  Patented April 28, 1908.

Application filed August 8, 1906. Serial No. 329,694.

*To all whom it may concern:*

Be it known that I, FRANK M. FOOTE, a citizen of the United States, residing at Marshall, in the county of Calhoun and State of Michigan, have invented a new and useful Improvement in Roller-Bearings, of which the following is a specification.

The present invention relates to that class of nuts which are commonly employed in connection with the axles of vehicles, and has for its object to provide a nut of this character embodying novel means for resisting the outward thrust of the wheel.

A further object is to accomplish the results by means of few and simple parts which are permanently connected to the nut and which can be very easily manufactured and assembled.

Figure 1:
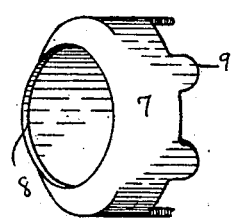
Figure 2:
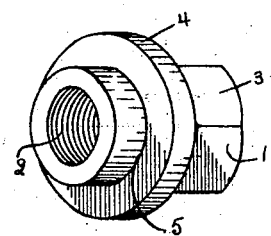
Figure 3:
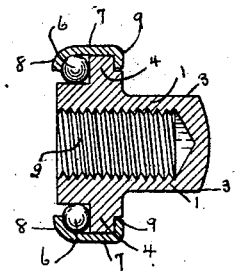

For a full description of the invention and the merits thereof and also to acquire a knowledge of the details of construction of the means for effecting the result, reference is to be had to the following description and accompanying drawings, in which:

Figure 1 is a view of the outer casing or collar. Fig. 2 is a nut of the required design for the construction of this roller bearing. Fig. 3 is a longitudinal sectional view through the nut and bearings as finally completed.

Corresponding and like parts are referred to in the following description and indicated in all the views of the drawings by the same reference characters:

The numeral 1 designates the nut which is internally threaded at 2 so as to fit upon any ordinary axle in the usual manner, the outer portion of the nut is given a square formation at 3 which enables it to be readily engaged by a wrench or similar tool, while the inner portion of the nut is enlarged at 4. The edge of the enlarged portion 4 is rabbeted at 5 to form an annular guideway for the bearing rollers 6. The bearing rollers 6 are held in position by means of a casing or collar 7 which fits loosely upon the enlarged portion 4 of the nut. The inner edge of the casing or collar 7 is formed with an inwardly extending flange 8 which engages with the rollers 6 to hold the same against displacement. The outer edge of the casing or collar 7 is formed with projections 9 which are bent inwardly after the casing or collar has been placed in position so that they fit around the enlarged portion 4 and prevent the casing or collar from slipping off. With this construction, it will be apparent that the casing or collar 7 is free to rotate upon the nut 1 and can turn with the wheel so as to practically eliminate the friction caused by the outward thrust of the wheel. Particular attention is directed to the method employed for securing the members in position, and without the aid of a ring or ball-plate, by letting flange 8 project farther inwardly so as to hold rollers 6 in position, the other end of casing or collar 7 having the projections 9 crimped around the enlarged portion 4 of the nut. Owing to the fact that the casing or collar 7 is free to rotate as it comes in contact with the outward thrust of the wheel, the necessity for a careful connection between the two members is obviated.

Having thus described my invention, what I claim as new and desire to secure by Letters Patent, is:—

In a roller bearing, the combination of a threaded nut, bearing rollers located within a race-way thereon, and a casing loosely mounted upon the nut and fitting over and against the bearing rollers to hold them against displacement, the casing being free to rotate with respect to the nut and having means provided whereby it is prevented from slipping off from the nut, the casing also having an opening that permits the threaded portion of said nut to engage with the threaded portion of a spindle.

FRANK M. FOOTE.

Witnesses:
 LOUIS C. MILLER,
 CHARLES O. MILLER.